United States Patent
Yamasaki et al.

(10) Patent No.: US 12,023,659 B2
(45) Date of Patent: Jul. 2, 2024

(54) CHA-TYPE ZEOLITE AND MANUFACTURING METHOD THEREOF

(71) Applicant: TOSOH CORPORATION, Yamaguchi (JP)

(72) Inventors: Yoshitaka Yamasaki, Yamaguchi (JP); Tomoya Ishikawa, Yamaguchi (JP); Keita Nakao, Yamaguchi (JP); Takuya Okada, Yamaguchi (JP); Yusuke Naraki, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 0 days.

(21) Appl. No.: 17/552,941

(22) Filed: Dec. 16, 2021

(65) Prior Publication Data

US 2022/0193644 A1 Jun. 23, 2022

(30) Foreign Application Priority Data

Dec. 21, 2020 (JP) ................. 2020-211757

(51) Int. Cl.
*B01J 29/70* (2006.01)
*B01J 29/76* (2006.01)

(52) U.S. Cl.
CPC ......... *B01J 29/7015* (2013.01); *B01J 29/763* (2013.01)

(58) Field of Classification Search
None
See application file for complete search history.

(56) References Cited

U.S. PATENT DOCUMENTS

| | | |
|---|---|---|
| 4,544,538 A | 10/1985 | Zones |
| 2007/0100185 A1 | 5/2007 | Cao et al. |
| 2008/0045767 A1 | 2/2008 | Cao et al. |
| 2019/0105639 A1 | 4/2019 | Maehama et al. |
| 2020/0392009 A1 | 12/2020 | Li et al. |

FOREIGN PATENT DOCUMENTS

| | | | |
|---|---|---|---|
| CN | 108455628 | * | 8/2018 |
| WO | 2010054034 | * | 5/2010 |
| WO | 2011/073398 | | 6/2011 |
| WO | 2012/145323 | | 10/2012 |
| WO | 2013/068976 | | 5/2013 |
| WO | 2013/182974 | | 12/2013 |
| WO | 2019/213027 | | 11/2019 |

OTHER PUBLICATIONS

English translation of Hidekazu, Aoyama CN 108455628 (2018) (Year: 2018).*
Office Action dated Mar. 5, 2024 in European family member application No. 21 214 063.6.
"Sitting of the Cu+ ions in dehydrated ion exchanged synthetic and natural chabasites: a Cu+ photoluminescence study", Microporous and Mesoporous Materials, vol. 32 (1999), p. 63-74.

* cited by examiner

*Primary Examiner* — Sheng H Davis
(74) *Attorney, Agent, or Firm* — GREENBLUM & BERNSTEIN, P.L.C.

(57) ABSTRACT

CHA-type zeolite in which the molar ratio of silica to alumina is less than 13, and the content of sodium is 100 ppm or more and 2000 ppm or less is provided. Such a CHA-type zeolite is obtained by a manufacturing method including obtaining a crystallized product by crystallizing a composition which includes a structure-directing agent source containing at least N,N,N-trialkylcyclohexylammonium cation, an alumina source, a silica source, a sodium source, and water and in which the molar ratio of silica to alumina is 20 or less and in which the molar ratio of potassium to sodium is less than 0.05, removing N,N,N-trialkylcyclohexylammonium cation from the crystallized product, and contacting the crystallized product with an ammonium-salt-containing solution having an ammonium concentration of 1 mass percent or more.

13 Claims, 2 Drawing Sheets

CHA-TYPE ZEOLITE AND MANUFACTURING METHOD THEREOF

TECHNICAL FIELD

The present disclosure relates to CHA-type zeolite, particularly relates to CHA-type zeolite crystallized from a raw material composition including N,N,N-trialkylcyclohexylammonium cation as a structure-directing agent.

BACKGROUND ART

CHA-type zeolite is artificially synthesized zeolite reported in PATENT LITERATURE 1, and is widely used as a nitrogen oxide reduction catalyst or a petrifaction catalyst.

In PATENT LITERATURE 1, CHA-type zeolite is crystallized by using an expensive structure-directing agent such as N,N,N-trimethyl-1-adamantaneammonium cation. Meanwhile, a manufacturing method of CHA-type zeolite using inexpensive N,N,N-trialkylcyclohexylammonium cation as a structure-directing agent has been suggested (e.g., PATENT LITERATURES 2 and 3). PATENT LITERATURES 2 and 3 disclose that CHA-type zeolite in which the molar ratio of silica to alumina (hereinafter, also referred to as "$SiO_2/Al_2O_3$ ratio".) is more than 100 (PATENT LITERATURE 2), and CHA-type zeolite in which the $SiO_2/Al_2O_3$ ratio is 13 or more (PATENT LITERATURE 3) can be obtained.

CITATION LIST

Patent Literature

PATENT LITERATURE 1: U.S. Pat. No. 4,544,538
PATENT LITERATURE 2: US Patent No. 2008/0045767
PATENT LITERATURE 3: US Patent No. 2019/0105639

SUMMARY OF INVENTION

Technical Problem

A manufacturing method of CHA-type zeolite using N,N,N-trialkylcyclohexylammonium cation as a structure-directing agent does not specifically report CHA-type zeolite with a low $SiO_2/Al_2O_3$ ratio.

The present disclosure is directed to provide at least one of CHA-type zeolite crystallized from a raw material composition including N,N,N-trialkylcyclohexylammonium cation as a structure-directing agent, having a low $SiO_2/Al_2O_3$ ratio, and being capable of providing a catalyst showing a practical nitrogen oxide reduction rate, a manufacturing method thereof, and a nitrogen oxide reduction catalyst including the same.

Solution to Problem

The present inventors have found out that a manufacturing method of CHA-type zeolite crystallizing a composition including N,N,N-trialkylcyclohexylammonium cation as a structure-directing agent (hereinafter, also referred to as a "raw material composition".) has a problem where CHA-type zeolite, capable of providing a catalyst showing a practical nitrogen oxide reduction rate, cannot be obtained only by decreasing the $SiO_2/Al_2O_3$ ratio of a raw material composition, and that the above problem is solvable by paying attention to conditions of crystallization and a treatment after crystallization, particularly the relation between the conditions of crystallization and the treatment after crystallization.

The present invention is as claimed, and the gist of the present disclosure is as follows.

[1] A CHA-type zeolite, wherein the molar ratio of silica to alumina is less than 13, and the content of sodium is 100 ppm or more and 2000 ppm or less.
[2] The CHA-type zeolite according to [1], wherein the molar ratio of potassium to sodium is less than 0.05.
[3] The CHA-type zeolite according to [1] or [2], wherein the content of a silanol group per mass in CHA-type zeolite is $0.50 \times 10^{20}$/g or less.
[4] The CHA-type zeolite according to any one of [1] to [3], wherein the CHA-type zeolite is CHA-type zeolite crystallized from a composition containing N,N,N-trialkylcyclohexylammonium cation.
[5] The CHA-type zeolite according to any one of [1] to [3], wherein a cation type is one of an ammonium type and a proton type.
[6] The CHA-type zeolite according to any one of [1] to [4], containing one or more metallic elements selected from the group consisting of platinum, palladium, rhodium, iron, copper, cobalt, manganese, and indium.
[7] The CHA-type zeolite according to [5], wherein the metallic element is contained in a state of being supported outside a zeolite framework.
[8] A manufacturing method of CHA-type zeolite according to any one of [1] to [5], including the steps of: obtaining a crystallized product by crystallizing a composition which includes a structure-directing agent source containing at least N,N,N-trialkylcyclohexylammonium cation, an alumina source, a silica source, a sodium source, and water and in which the molar ratio of silica to alumina is 20 or less and in which the molar ratio of potassium to sodium is less than 0.05; removing N,N,N-trialkylcyclohexylammonium cation from the crystallized product; and contacting the crystallized product with an ammonium-salt-containing solution having an ammonium concentration of 1 mass percent or more.
[9] The manufacturing method according to [8], wherein the N,N,N-trialkylcyclohexylammonium cation is at least one of N,N,N-dimethylethylcyclohexylammonium cation and N,N,N-methyldiethylcyclohexylammonium cation.
[10] The manufacturing method according to [8] or [9], wherein the composition includes at least an amorphous compound including silicon and aluminum as a silica source and an alumina source, and includes at least one of a hydroxide or a halide of sodium as a sodium source.
[11] The manufacturing method according to any one of [8] to [10], wherein a crystallization temperature is more than 150° C.
[12] The manufacturing method according to any one of [8] to [11], wherein the composition includes at least amorphous aluminosilicate.
[13] A nitrogen oxide reduction catalyst including CHA-type zeolite according to any one of [1] to [7].
[14] A nitrogen oxide reduction method using the nitrogen oxide reduction catalyst according to [13].

ADVANTAGEOUS EFFECTS OF INVENTION

Figure 1:
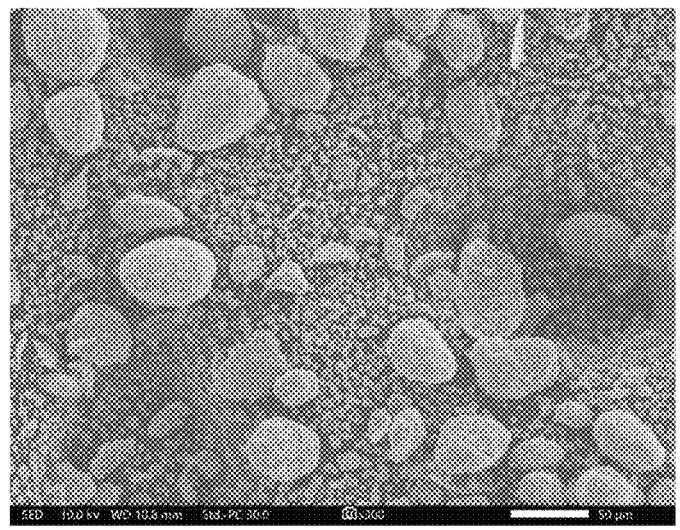
FIG. 1 is an SEM image of CHA-type zeolite according to Example 1 (the scale in the view is 30 μm).

The present disclosure can provide at least one of CHA-type zeolite crystallized from a raw material composition including N,N,N-trialkylcyclohexylammonium cation as a structure-directing agent, having a low $SiO_2/Al_2O_3$ ratio, and being capable of providing a catalyst showing a practical nitrogen oxide reduction rate, a manufacturing method thereof, and a nitrogen oxide reduction catalyst including the same.

DESCRIPTION OF EMBODIMENTS

CHA-type zeolite according to the present disclosure is described by showing one example of an embodiment.

Each term in the present embodiment is as follows.

"Zeolite" is a compound in which a framework atom (hereinafter, also referred to as a "T atom") has a regular structure with intervening oxygen (O) and in which the T atom includes at least one of a metallic atom or a metalloid atom. One or more selected from the group consisting of aluminum (Al), iron (Fe), and gallium (Ga) can be exemplified as a metallic atom. One or more selected from the group consisting of boron (B), silicon (Si), germanium (Ge), arsenic (As), antimony (Sb), and tellurium (Te) can be exemplified as a metalloid atom.

A "zeolite analogue" is a compound in which a T atom has a regular structure with intervening oxygen and in which the T atom includes at least an atom other than metals and metalloids (hereinafter, also referred to as a "nonmetallic atom"). A nonmetallic atom includes phosphorus (P), and a complex phosphorus compound such as aluminophosphate (AlPO) or silicoaluminophosphate (SAPO) can exemplify a zeolite analogue.

A "regular structure that a T atom has with intervening oxygen" (hereinafter, also referred to as a "zeolite structure") in zeolite or a zeolite analogue is a framework structure determined by a structure code defined by the Structure Commission of International Zeolite Association (hereinafter, also briefly referred to as a "structure code"). For example, a CHA structure is a framework structure specified as a structure code "CHA". A zeolite structure can be identified by a comparison with an XRD pattern (hereinafter, also referred to as a "reference pattern") of each structure described in Collection of simulated XRD powder patterns for zeolites, Fifth revised edition (2007). In the present embodiment, a framework structure, a crystal structure, and a crystalline phase are interchangeably used.

"Aluminosilicate" is a complex oxide having a structure constituted of the repetition of a network with intervening aluminum (Al), silicon (Si), and oxygen (O; framework oxygen). In the present embodiment, aluminosilicate may include a complex oxide which has a structure constituted of the repetition of a network with intervening aluminum (Al), silicon (Si), and oxygen (O) and in which a part of aluminum (e.g., 30% or less of aluminum as a T atom) is substituted by another metallic atom. Aluminosilicate having a crystalline XRD peak in a powder X-ray diffraction (hereinafter, also referred to as "XRD".) pattern is "crystalline aluminosilicate, and aluminosilicate having no crystalline XRD peak is "amorphous aluminosilicate".

An XRD pattern in the present embodiment is measured as a CuKα ray as a radiation source, and measurement conditions include the following conditions.

Acceleration voltage/current: 40 mA/40 kV
Radiation source: CuKα ray (λ=1.5405 Å)
Measurement mode: continuous scan
Scan condition: 40°/minute
Measurement range: 2θ=3° to 43°
Divergence longitudinal restriction slit: 10 mm
Divergence/entrance slit: 1°
Receiving slit: open
Receiving solar slit: 5°
Detector: semiconductor detector (D/teX Ultra)
Filter: Ni filter An XRD pattern can be measured by using a general powder X-ray diffractometer (e.g., UltimaIV, manufactured by Rigaku Corporation). Moreover, a crystalline XRD peak is a peak at which 2θ of a peak top is determined and detected in an analysis of an XRD pattern using general analysis software (e.g., Smart Lab Studio II, manufactured by Rigaku Corporation). Analysis conditions of an XRD pattern include the following conditions.

Fitting condition: automatic, make background finer, distributed pseudo voigt function (peak shape)
Background removal method: fitting process
Kα2 removal method: Kα1/Kα2 ratio=0.497
Smoothing method: B-Spline curve
Smoothing condition: second-derivative method, α-cut value=3, χ threshold=1.5

A composition according to the present embodiment, such as the molar ratio of silica to alumina, may be measured by an ICP analysis by a general inductively coupled plasma emission spectrometer (e.g., OPTIMA7300DV, manufactured by PERKIN ELMER Corporation).

<CHA-Type Zeolite>

CHA-type zeolite according to the present embodiment is synthetic zeolite, and is synthetic zeolite obtained by crystallizing a raw material composition including a structure-directing agent (hereinafter, also referred to as an "SDA"), particularly, synthetic CHA-type zeolite crystallized from a raw material composition including N,N,N-trialkylcyclohexylammonium cation (hereinafter, also referred to as "TACH$^+$") as a structure-directing agent. In the present embodiment, "synthetic zeolite" is a term opposite to naturally produced zeolite (natural zeolite).

CHA-type zeolite according to the present embodiment may be such that the molar ratio of silica to alumina ($SiO_2/Al_2O_3$ ratio) is less than 13, 12 or less, 11 or less, or 10 or less. Even with such a low $SiO_2/Al_2O_3$ ratio, CHA-type zeolite according to the present embodiment can be a catalyst and a carrier thereof indicating a nitrogen oxide reduction property equivalent to that of conventional CHA-type zeolite having a high $SiO_2/Al_2O_3$ ratio of about 22 to 24. The $SiO_2/Al_2O_3$ ratio of CHA-type zeolite according to the present embodiment is preferably 6 or more, 8 or more, 9 or more, or 9.5 or more.

CHA-type zeolite according to the present embodiment preferably has a sodium content of 100 ppm or more and 2000 ppm or less. CHA-type zeolite according to the present embodiment preferably has a sodium content of more than 100 ppm, 120 ppm or more, or 200 ppm or more, and 1500 ppm or less, 1300 ppm or less, 1000 ppm or less, or 800 ppm or less, or 500 ppm or less. Heretofore, sodium present in synthetic CHA-type zeolite is known to deteriorate properties such as a heat-resistant property and catalytic activity. In contrast, it is considered that in the crystallization of a raw material composition including TACH$^+$ as an SDA and having a low $SiO_2/Al_2O_3$ ratio, a part of sodium is more easily taken into a zeolite structure in a state of contributing to the improvement of the properties of zeolite. It is considered that in CHA-type zeolite obtained by crystallizing a raw material composition including $TACH^+$ as an SDA and having a low $SiO_2/Al_2O_3$ ratio, sodium in a state of deteriorating properties is mainly removed, and sodium in a state of contributing to the improvement of properties remains, if the content of sodium in the CHA-type zeolite is brought in a range according to the present embodiment. Specifically, CHA-type zeolite according to the present embodiment preferably contains sodium taken in in a crystallization process of the CHA-type zeolite (hereinafter, also referred to as "remaining Na). The content of sodium in CHA-type zeolite according to the present embodiment is preferably the content of remaining Na. It is considered that CHA-type zeolite according to the present embodiment particularly includes sodium in a state of contributing to the improvement of properties as its main component among remaining Na. CHA-type zeolite according to the present embodiment does not need to include sodium supported after a crystallization step, such as ion-exchanged sodium (hereinafter, also referred to as "subsequently supported Na".), but may include subsequently supported Na to the extent that the effects of the CHA-type zeolite are not impaired.

In the present embodiment, the content of sodium is a mass ratio [mass ppm] of sodium (Na) converted into $Na_2O$, to the dry mass of CHA-type zeolite. The dry mass of CHA-type zeolite is the mass of CHA-type zeolite after treated at 600° C. for one hour in the atmosphere.

In the present embodiment, the content of sodium may be derived by an ICP analysis using a general inductively coupled plasma emission spectrometer (apparatus name, OPTIMA7300DV, manufactured by PERKIN ELMER Corporation). Before a composition analysis, a sample may be dissolved into a mixed solution of fluorine and nitrate to serve as a measurement solution.

The content of sodium in the present embodiment is preferably a value at which a cation type is particularly one of an ammonium type ($NH_4$ type) and a proton type ($H^+$ type), more particularly an ammonium type. In the present embodiment, CHA-type zeolite of an ammonium type is CHA-type zeolite in a state after CHA-type zeolite is subjected to ion exchange with a solution containing ammonium salt (e.g., ammonium chloride: particularly, ammonium chloride having an ammonium concentration of 1 mass percent or more, 5 mass percent or more, or 10 mass percent or more and 40 mass percent or less, or 30 mass present or less). Moreover, CHA-type zeolite of a proton type is, for example, CHA-type zeolite in a state after CHA-type zeolite of an ammonium type is thermally treated at 400° C. or more and 800° C. or less in the atmosphere.

CHA-type zeolite according to the present embodiment may include potassium as long as the molar ratio of potassium to sodium (hereinafter, also referred to as a "K/Na ratio") is less than 0.05. The K/Na ratio of CHA-type zeolite according to the present embodiment is preferably less than 0.05, 0.03 or less, or 0.01 or less. CHA-type zeolite according to the present embodiment preferably does not substantially include potassium (i.e. the K/Na ratio is 0 (zero), but the K/Na ratio may be 0 or more, more than 0, or 0.005 or more when a margin of measurement error or the like is taken into consideration. CHA-type zeolite according to the present embodiment preferably has a molar ratio of other alkaline metals to sodium (i.e., one or more selected from the group consisting of lithium, rubidium, and cesium) (hereinafter, also referred to as an "M/Na ratio") of 0 or more, more than 0 or 0.005 or more, and less than 0.05 or 0.01 or less.

CHA-type zeolite according to the present embodiment preferably does not include fluorine (F) or phosphorus (P), and the content of each of fluorine and phosphorus in CHA-type zeolite includes a content equal to or less than a measurement limit (e.g., a fluorine content of 1 ppm or less, a phosphorus content of 1 ppm or less, or fluorine and phosphorus content of 1 ppm or less).

CHA-type zeolite according to the present embodiment is CHA-type zeolite crystallized from a raw material composition including a structure-directing agent, and may be CHA-type zeolite crystallized from a raw material composition including $TACH^+$ as a structure-directing agent. CHA-type zeolite in a state of being crystallized from a raw material composition including $TACH^+$ as a structure-directing agent may include a structure-directing agent. On the other hand, CHA-type zeolite according to the present embodiment does not need to include a structure-directing agent, from the perspective of being used for a purpose such as a catalyst or an adsorbent.

CHA-type zeolite according to the present embodiment preferably has a characteristic of being crystallized from such a raw material composition. One such characteristic includes, for example, a content of a silanol group per mass in CHA-type zeolite (hereinafter, also referred to as an "SiOH amount".) is $0.50 \times 10^{20}$/g or less or $0.30 \times 10^{20}$/g or less. A silanol group is formed in silicon (Si) present at the end of a zeolite structure. Zeolite that really exists has an end present in the zeolite structure. The SiOH amount of CHA-type zeolite according to the present embodiment is more than 0/g, and can include $0.10 \times 10^{20}$/g or more.

An SiOH amount can be derived by a calibration curve method, from the mass of CHA-type zeolite, and integrated intensity of a peak (a peak having a peak top at 2.0±0.4 ppm) attributed to a silanol group of a $^1$H MAS NMR spectrum of CHA-type zeolite.

The mass of CHA-type zeolite in the calculation of an SiOH amount is mass after physically adsorbed water is removed, and is, for example, mass of CHA-type zeolite after a pretreatment described later.

Measurement conditions of a $^1$H MAS NMR spectrum include the following conditions.

Resonant frequency: 400 MHz
Pulse width: $\pi/2$
Measurement wait time: 10 seconds
Accumulated number: 32 times
Rotational frequency: 15 kHz
Shift standard: TMS (tetramethylsilane)

A $^1$H MAS NMR spectrum can be measured by using a general NMR apparatus (e.g., VNMRS-400, manufactured by Varian Corporation).

An NMR spectrum may be analyzed by implementing waveform separation by a Gaussian function, and deriving the integrated intensity of a peak having a peak top at 2.0±0.4 ppm. Waveform separation can be implemented by general NMR spectrum analysis software (e.g., GRAMS/AI Ver. 8.0, manufactured by Thermo Fisher Corporation).

Before an NMR measurement, a sample is pretreated. A pretreatment may be a treatment that can remove physically adsorbed water, and includes holding for 5±2 hours at 400° C. under vacuum atmosphere.

Before a measurement, a calibration curve may be obtained by using a result of NMR measurement of benzene as a standard substance. A calibration curve is produced from three or more (e.g., 3 to 5) standard samples (e.g., 0 mmol, 0.01 mmol, 0.02 mol, and the like) different in amount, within a range of a benzene amount of 0 mmol to 0.02 mmol. An NMR measurement is implemented for each standard sample under the abovementioned conditions. Then, an obtained correlation between a proton amount in each standard sample and the integrated intensity of a spectrum is plotted, and thereby a calibration curve that converts the integrated intensity and the proton amount can be generated.

An SiOH amount may be derived as a proton amount [number/g] relative to the mass of CHA-type zeolite.

CHA-type zeolite according to the present embodiment preferably has a single phase of a CHA structure, and more preferably has an XRD pattern similar to SSZ-13.

CHA-type zeolite according to the present embodiment includes at least one of crystal grains formed by individual primary particles, and crystal grains formed by chemical aggregation of primary particles (aggregate). The crystal grains according to the present embodiment may have any shape. The crystal grains of CHA-type zeolite according to the present embodiment is at least one or more selected from the group consisting of crystal grains having one of rhombohedral and cubic (a hexahedron in which the lengths of all sides are equal) shapes, polyhedral crystal grains including some faces of primary particles having at least either a rhombohedral or cubic shape, and irregular shapecrystal grains. Crystal grains of CHA-type zeolite according to the present embodiment may be crystal grains that do not have some faces of primary particles having at least either a rhombohedral or cubic shape, and include, for example, crystal grains having a nearly spherical irregular shape, more particularly, approximately spherical crystal grains. The grain size of crystal grains (hereinafter, also referred to as a "crystal grain size") can be exemplified by 0.1 μm or more or 0.3 μm or more, and 2 μm or less or 1 μm or less. CHA-type zeolite according to the present embodiment preferably includes at least crystal grains of 0.1 μm or more or 0.5 μm or more, and 1 μm or less or 0.8 μm or less. Further, CHA-type zeolite according to the present embodiment preferably has, as matrix (main phase), crystal grains of 0.1 μm or more or 0.5 μm or more, and 1 μm or less or 0.8 μm or less.

CHA-type zeolite according to the present embodiment may be in a state where crystal grains are dispersed, but may form an agglomerated particle (agglomerate) in which two or more crystal grains are physically agglomerated, particularly may include an agglomerated particle, more particularly may be constituted of an agglomerated particle. The shape of a crystal grain may be irregular, and the agglomerated particle size can be exemplified by 5 μm or more or 10 μm or more, and by 100 μm or less or 70 μm or less.

A crystal grain is a minimum unit grain observed in SEM observation at an observation magnification of 30 to 20,000, and the greatest length observed in SEM observation may be measured for a crystal grain size. The greatest length of a grain in which crystal grains are agglomerated may be measured for an agglomerated grain size.

CHA-type zeolite according to the present embodiment may contain an active metallic element. An active metallic element is preferably a transition metallic element, and is one or more elements selected from the group consisting of Group 8, Group 9, Group 10, and Group 11 of the periodic table, one or more elements selected from the group consisting of platinum (Pt), palladium (Pd), rhodium (Rh), iron (Fe), copper (Cu), cobalt (Co), manganese (Mn), and indium (In), particularly, one or more metallic elements selected from the group consisting of cobalt (Co), nickel (Ni), iron (Fe), and copper (Cu), more particularly, at least one of iron and copper, still more particularly copper.

An active metallic element is preferably contained in a state other than a T atom, for example, in a state of being loaded outside a zeolite framework, such as a state of being loaded on at least one of a pore and an ion-exchange site.

CHA-type zeolite according to the present embodiment may have an active metallic element content of 2.5 mass percent or more, 3.0 mass percent or more, or 3.5 mass percent or more, and may have an active metallic element content of 6.5 mass percent or less, 6.0 mass percent or less, or 5.5 mass percent or less.

CHA-type zeolite according to the present embodiment can be applied to known applications of zeolite such as a catalyst, an adsorbent, and a carrier thereof, particularly, can be used as a nitrogen oxide reduction catalyst and a carrier thereof, more particularly, can be used as a nitrogen oxide reduction catalyst. The nitrogen oxide reduction catalyst can serve in a nitrogen oxide reduction method using the same. Further, CHA-type zeolite according to the present embodiment can be used as an exhaust gas purify catalyst, particularly, an exhaust gas treatment catalyst of an internal combustion engine, more particularly, an automobile exhaust gas treatment catalyst, and can also be used as a carrier thereof.

<Manufacturing Method of CHA-Type Zeolite>

A manufacturing method of CHA-type zeolite according to the present embodiment is a manufacturing method including the steps of obtaining a crystallized product by crystallizing a composition which includes a structure-directing agent source containing at least N,N,N-trialkylcyclohexylammonium cation, an alumina source, a silica source, a sodium source, and water and in which the molar ratio of silica to alumina is 20 or less and in which the molar ratio of potassium to sodium is less than 0.05; removing N,N,N-trialkylcyclohexylammonium cation from the crystallized product; and contacting the crystallized product with an ammonium-salt-containing solution having an ammonium concentration of 1 mass percent or more.

(Crystallization Step)

It is considered that CHA-type zeolite is crystallized while part of sodium (Na) is taken in a state of improving the properties of CHA-type zeolite by the step of obtaining a crystallized product by crystallizing a composition (hereinafter, also referred to as a "raw material composition".) which includes a structure-directing agent source containing at least N,N,N-trialkylcyclohexylammonium cation, an alumina source, a silica source, a sodium source, and water and in which the molar ratio of silica to alumina is 20 or less and in which the molar ratio of potassium to sodium is less than 0.05 (hereinafter, also referred to as a "crystallization step".).

A crystallized product obtained by the crystallization step tends to have a lower $SiO_2/Al_2O_3$ ratio than a raw material composition. In order to crystallize CHA-type zeolite according to the present embodiment, the molar ratio of silica to alumina ($SiO_2/Al_2O_3$ ratio) in a raw material composition is preferably 20 or less, 15 or less, less than 13, 11 or less, or 10 or less. The $SiO_2/Al_2O_3$ ratio may be 3 or more, 5 or more, or 8 or more.

A raw material composition has a molar ratio of potassium to sodium (K/Na ratio) of less than 0.05, preferably has a K/Na ratio of 0.03 or less or 0.01 or less, and preferably has a K/Na ratio of 0 (i.e., no potassium is contained). In a raw material composition in which N,N,N-trialkylcyclohexylammonium cation is a structure-directing agent and in which the $SiO_2/Al_2O_3$ ratio is around 20 or less, CHA-type zeolite becomes easy to crystallize, by setting a high K/Na ratio. In contrast, when a K/Na ratio is high, a by-product phase having a zeolite structure other than a CHA structure is easily generated from a raw material composition having a particularly low $SiO_2/Al_2O_3$ ratio in which the N,N,N-trialkylcyclohexylammonium cation is a structure-directing agent and in which the $SiO_2/Al_2O_3$ ratio is 15 or less, and CHA-type zeolite is not easily obtained with a single phase. When a K/Na ratio is in this range, generation of a by-product phase, particularly ERI-type zeolite, is constrained, and CHA-type zeolite with a single phase is obtained.

An alumina source is at least one of alumina ($Al_2O_3$) and a precursor thereof, includes, for example, at least one or more selected from the group consisting of alumina, aluminum sulfate, aluminum nitrate, sodium aluminate, aluminum hydroxide, aluminum chloride, amorphous aluminosilicate, metallic aluminum, crystalline aluminosilicate, and aluminum alcoxide, and is preferably an amorphous aluminum compound, particularly, at least one of aluminum hydroxide and amorphous aluminosilicate, more particularly, amorphous aluminosilicate.

A silica source is at least silica ($SiO_2$) or a precursor thereof, includes at least, for example, one or more selected from the group consisting of colloidal silica, amorphous silica, sodium silicate, tetraethylsilane, tetraethylorthosilicate, precipitation-method silica, fumed silica, amorphous aluminosilicate, and crystalline aluminosilicate, and is preferably amorphous aluminosilicate.

A raw material composition preferably includes at least an amorphous alumina source and silica source, particularly, at least amorphous aluminosilicate. A raw material composition does not include crystalline aluminosilicate as an alumina source and a silica source, is thus easily reduced in manufacturing cost, and is industrially advantageous.

A sodium source includes salt or a compound including sodium. A sodium source includes one or more selected from the group consisting of a chloride, an iodide, a bromide, a hydroxide, and an oxide of sodium, particularly, one or more selected from the group consisting of a chloride, a bromide, and a hydroxide of sodium, more particularly, sodium hydroxide. Sodium included in other starting materials can also be regarded as a sodium source. A raw material composition preferably includes at least sodium hydroxide.

A raw material composition may include alkaline metals other than sodium, i.e., one or more selected from the group consisting of potassium, rubidium, and cesium, particularly, potassium, as long as the amount thereof is small as compared with sodium.

A structure-directing agent source contains at least N,N,N-trialkylcyclohexylammonium cation ($TACH^+$). $TACH^+$ functions as a structure-directing agent (hereinafter, also referred to as an "SDA".) that directs a CHA structure. An SDA source is salt including SDA, and can be exemplified by one or more selected from the group consisting of a hydroxide, a halide, carbonate monoester salt, and sulfate monoester salt of SDA, by one or more selected from the group consisting of a hydroxide, a chloride, a bromide, and an iodide, by one or more selected from the group consisting of a hydroxide, a bromide, and an iodide, by at least one of a hydroxide and a bromide, or by a hydroxide, for example.

$TACH^+$ included in an SDA source includes one or more selected from the group consisting of N,N,N-trimethylcyclohexylammonium cation (hereinafter, also referred to as "$TMCH^+$"), N,N,N-dimethylethylcyclohexylammonium cation (hereinafter, also referred to as "$DMECH^+$"), N,N,N-methyldiethylcyclohexylammonium cation (hereinafter, also referred to as "$MDECH^+$"), and N,N,N-triethylcyclohexylammonium cation (hereinafter, also referred to as "$TECH^+$"), at least one of $DMECH^+$ and $MDECH^+$, or $DMECH^+$. In order to crystallize CHA-type zeolite having an $SiO_2/Al_2O_3$ ratio according to the present embodiment, $TACH^+$ included in an SDA source is preferably $TACH^+$ other than $TMCH^+$, preferably at least one of $DMECH^+$ and $MDECH^+$, particularly, $DMECH^+$.

SDA contained in a raw material composition may be $TACH^+$ (only $TACH^+$ alone), particularly, one or more selected from the group consisting of $DMECH^+$, $MDECH^+$, and $TECH^+$, more particularly, at least one of $DMECH^+$ and $MDECH^+$, still more particularly, $DMECH^+$ ($DMECH^+$ alone). On the other hand, a raw material composition may contain SDA other than $TACH^+$ that directs a CHA structure (hereinafter, also referred to as "Add-SDA"). Add-SDA includes one or more selected from the group consisting of N,N,N-trialkyladamantaneammonium cation (hereinafter, also referred to as "$TAad^+$"), trimethylbenzilammonium cation, and tetraethylammonium cation, and the like. Specific Add-SDA includes $TAad^+$, particularly, N,N,N-trimethyladamantaneammonium cation. When Add-SDA is included, a raw material composition is preferably included at a ratio lower than $TACH^+$.

Since CHA-type zeolite is crystallized mainly by a structure-directing effect of $TACH^+$, the molar ratio of Add-SDA to $TMCH^+$ in a raw material composition (hereinafter, also referred to as a "Add-SDA/SDA ratio".) may be 1 or less, less than 1, 0.5 or less, or 0.4 or less. A raw material composition does not need to include Add-SDA, and an Add-SDA/SDA ratio may be 0 (zero). However, a raw material composition may include Add-SDA, and an Add-SDA/SDA ratio may be more than 0 or 0.05 or more.

Water included in a raw material composition includes deionized water or pure water, further, it may be water ($H_2O$) included in other starting materials, such as structured water or a solvent.

A raw material composition preferably may not include fluorine (F) and phosphorus (P). The content of each of fluorine and phosphorus in a raw material composition includes a content equal to or less than a measurement limit (e.g., a fluorine content of 1 ppm or less, a phosphorus content of 1 ppm or less, or a fluorine and phosphorus content of 1 ppm or less).

A raw material composition preferably contains at least an amorphous compound including silicon and aluminum as a silica source and an alumina source, and at least one of a hydroxide and a halide of sodium as a sodium source. It is considered, in a raw material composition including $TMCH^+$ as SDA, CHA-type zeolite is crystallized without uneven distribution of sodium by the coexistence of such SDA, an amorphous compound including silicon and aluminum, such as amorphous aluminosilicate, and at least one of a hydroxide and a halide of sodium that is sodium salt. Thereby, it is considered, as compared with the crystallization of a raw material composition including individual substances as an alumina source and a silica source, crystallization is achieved in a state where sodium that can deteriorate the properties of zeolite, such as sodium that blocks gas diffusion, is easily removed.

Preferable compositions of a raw material composition include the following molar compositions. In the following molar compositions, SDA is $TACH^+$, and an $SDA/SiO_2$ ratio when $TACH^+$ is $DMECH^+$ or the like may be regarded as a $DMECH^+/SiO_2$ ratio or the like. M is an alkaline metal other than sodium, and when a raw material composition includes 2 or more of alkaline metals other than sodium (e.g., potassium and cesium), the $M/SiO_2$ ratio may be regarded as a $(K+Cs)/SiO_2$ ratio or the like. Each composition ratio in a molar composition may be a value of any composition of an upper limit and a lower limit set forth below.

- $SiO_2/Al_2O_3$ ratio=3 or more, 5 or more, or 8 or more, and 20 or less, 15 or less, less than 13, 11 or less, or 10 or less
- $SDA/SiO_2$ ratio=0.01 or more, 0.02 or more, 0.05 or more, or 0.075 or more, and 0.5 or less, 0.3 or less, 0.2 or less, or 0.1 or less
- Add-SDA/SDA ratio=0 or more, more than 0, or 0.05 or more, and 1 or less, 0.5 or less, or 0.4 or less
- $Na/SiO_2$ ratio=more than 0, 0.1 or more, or 0.2 or more, and 0.60 or less, 0.5 or less, 0.4 or less, or 0.3 or less
- K/Na ratio=0 or more, 0.001 or more, or 0.005 or more, and less than 0.05, 0.03 or less, or 0.01 or less
- M/Na ratio=0 or more, 0.001 or more, or 0.005 or more, and less than 0.05, 0.03 or less, or 0.01 or less
- $H_2O/SiO_2$ ratio=3 or more, 5 or more, 10 or more, or 15 or more, and 50 or less, 30 or less, 20 or less, or 19 or less In order to accelerate the crystallization of CHA-type zeolite, seed crystal may be mixed into a raw material composition. Seed crystal can be exemplified by one or more selected from the group consisting of AEI-type zeolite, AFX-type zeolite, ERI-type zeolite, CHA-type zeolite, LEV-type zeolite, and OFF-type zeolite, particularly, CHA-type zeolite. For seed crystal mixed into a raw material composition, the ratio of the sum mass of silicon (Si) and aluminum (Al) of seed crystal respectively converted into $SiO_2$ and $Al_2O_3$ (hereinafter, also referred to as a "seed crystal content"), to the sum mass of silicon (Si) and aluminum (Al) of a raw material composition respectively converted into $SiO_2$ and $Al_2O_3$ can be exemplified by more than 0 mass percent, 0.5 mass percent or more, or 1 mass percent or more, and 10 mass percent or less, 5 mass percent or less, 3 mass percent or less. No seed crystal may be mixed into a raw material composition (i.e. a seed crystal content may be 0 mass percent).

A raw material composition is crystallized, in the crystallization step. A method of crystallization may be a method in which a raw material composition is crystallized, and may be hydrothermal synthesis. Conditions for hydrothermal synthesis can be exemplified by the following conditions.

- Crystallization temperature: 130° C. or more, 140° C. or more, more than 150° C., or more than 155° C., and 200° C. or less, 180 or less, or 170° C. or less
- Crystallization time: 1 hour or more, 10 hours or more, or 24 hours or more, and 7 days or less, 5 days or less, 3 days or less, or 2 days or less
- Crystallization state: at least one of a stirring state or a static state, or a stirring state
- Crystallization pressure: autogenous pressure For example, in the case of crystallizing CHA-type zeolite having an $SiO_2/Al_2O_3$ ratio of less than 10, CHA-type zeolite with a single phase can be crystallized within a crystallization time of 2 days or less as long as the crystallization temperature is more than 150° C. or more than 155° C., and 180° C. or less, or 170° C. or less.

(SDA Removing Step)

In the step of removing TACH$^+$ from a crystallized product (hereinafter, also referred to as an "SDA removing step"), TACH may be removed from a crystallized product (CHA-type zeolite) by any method.

SDA may be removed by any method that can remove TACH$^+$ from a crystallized product. An SDA removing method includes at least one of a calcination treatment and an acid treatment, and a calcination treatment is preferable. A calcination treatment includes, for example, treating CHA-type zeolite at 300° C. or more or 400° C. or more and at 600° C. or less or 500° C. or less in one or more atmospheres selected from the group consisting of an oxidizing atmosphere, an inert atmosphere, and a reduction atmosphere. A particularly preferable calcination method includes the inclusion of calcination at 300° C. or more and 600° C. or less in the atmosphere. Time of a calcination treatment (and an acid treatment) can be exemplified by 1 hour or more and 5 hours or less, but may be suitably changed depending on the amount of a crystallized product serving in a calcination treatment.

A crystallized product providing in the SDA removing step may be a material collected by solid-liquid separation or the like after the crystallization step, but may be the material that has been washed and dried.

For the washing of the crystallized product, a crystallized product (CHA-type zeolite), collected after crystallization, may be washed by any method. The washing includes washing a crystallized product obtained as a solid phase after the crystallization step with an amount of pure water whose mass is 10 times or more the mass of the crystallized product.

Drying may be implemented by any method that can remove water physically adsorbed in and/or on CHA-type zeolite, and includes, for example, treating CHA-type zeolite for 2 or more hours at 100° C. or more and 200° C. or less in at least one of an oxidizing atmosphere and an inert atmosphere.

(Alkali Removing Step)

A crystallized product from which TACH$^+$ has been removed (i.e., CHA-type zeolite including no TACH$^+$) is treated by the step of contacting an ammonium-salt-containing solution having an ammonium concentration of 1 mass percent or more with the crystallized product (hereinafter, also referred to as an "alkali removing step"). By washing the crystallized product with such an ammonium-salt-containing solution, sodium, in the form of deteriorating the properties of CHA-type zeolite, is efficiently removed, and the removal of sodium contributing to the property improvement of CHA-type zeolite is constrained.

An ammonium-containing solution includes salt of ammonium ($NH_4^+$), and a solvent.

The solvent may be a solvent into which ammonium salt is dissolved, may be at least one of alcohol and water, and may be water, i.e., the ammonium-containing solution may be ammonium-containing aqueous solution.

Ammonium salt maybe salt containing ammonium ($NH_4^+$), and may be exemplified by inorganic salt of ammonium, particularly, one or more selected from the group consisting of ammonium carbonate, ammonium chloride, and ammonium nitrate, more particularly, ammonium chloride.

An ammonium-containing solution preferably has an ammonium concentration ($NH_4^+$ concentration) of 1 mass percent or more, 2 mass percent or more, 5 mass percent or more, or 7 mass percent or more. It is considered that by treating a crystallized product (CHA-type zeolite containing no SDA) with such a high-concentration ammonium-containing solution, alkaline metals in a state capable of deteriorating the properties of CHA-type zeolite (such as a slight amount of an alkaline metal in a state of a compound including an oxide or the like, and an easily isolatable alkaline metal ion) are removed by priority. As a result, a nitrogen oxide reduction catalyst having a nitrogen oxide reduction property equivalent to that of CHA-type zeolite having an $SiO_2/Al_2O_3$ ratio of about 22 to 24, or CHA-type zeolite that can be a carrier thereof becomes easy to obtain.

The ammonium concentration of an ammonium-containing solution may be equal to or less than saturated concentration, and includes 30 mass percent or less, 25 mass percent or less, 20 mass percent or less, 15 mass percent or less, or 10 mass percent or less.

In order to moderately leave sodium (remaining Na) in CHA-type zeolite after the alkali removing step, particularly, in order to remove sodium that easily deteriorates the properties of CHA-type zeolite, the ratio of the mass of an ammonium-containing solution to the mass of a crystallized product (CHA-type zeolite containing no SDA) (hereinafter, also referred to as "$NH_4$/CHA") is preferably 10 or less, 8 or less, or 6 or less. $NH_4$/CHA may be more than 1, and 1.5 or more or 2 or more.

The crystallinity of CHA-type zeolite tends to deteriorate due to a post treatment, such as the removal of SDA, after crystallization. Thus, the crystallinity of CHA-type zeolite after the alkali removal relative to CHA-type zeolite after the crystallization step (as-synthesized) (hereinafter, also referred to as a "relative crystallinity") is 100% or less, 95% or less, 90% or less, or 86% or less. On the other hand, the relative crystallinity is preferably 76.5% or more, 78% or more, or 80% or more.

The relative crystallinity may be derived from the ratio of the peak height of an XRD peak corresponding to each CHA-type zeolite (20-1) face, after the crystallization step and the alkali removing step (CHA-type zeolite after alkali removal/CHA-type zeolite after the crystallization step; %). A peak having a peak top at $2\theta=20.7\pm0.2°$ may be regarded as an XRD peak corresponding to a CHA-type zeolite (20-1) face.

(Metal Containing Step)

When CHA-type zeolite according to the present embodiment is metal-containing CHA-type zeolite, a manufacturing method according to the present embodiment may include the step of contacting CHA-type zeolite with an active metal source (hereinafter, also referred to as an "metal containing step"). Thus, metal-containing CHA-type zeolite (or metal-loaded CHA-type zeolite) is obtained.

In the metal containing step, any active metallic element is contained in CHA-type zeolite after alkali removal, and any transition metallic element is preferably loaded on CHA-type zeolite. Metal may be contained by a method that contacts CHA-type zeolite with an active metal source in such a way that an active metallic element is included in addition to a T atom of CHA-type zeolite. For example, the method includes one or more selected from the group consisting of an ion-exchange method, an impregnation load method, an evaporation-to-dryness method, a precipitation load method, and a physical mixing method, and is preferably the impregnation load method.

An active metal source is at least one of salt and a compound including an active metallic element, and may be one or more selected from the group consisting of a nitrate, a sulfate, an acetate, a chloride, complex salt, an oxide, and a complex oxide, including an active metallic element, or one or more selected from the group consisting of a nitrate, a sulfate, and chloride.

Preferably, an active metallic element is a transition metallic element, particularly, one or more selected from the group consisting of Group 8, Group 9, Group 10, and Group 11 of the periodic table, more particularly, one or more selected from the group consisting of platinum (Pt), palladium (Pd), rhodium (Rh), iron (Fe), copper (Cu), cobalt (Co), manganese (Mn), and indium (In), still more particularly, at least one of iron and copper, or copper.

The manufacturing method according to the present embodiment may include the step of calcination metal-containing CHA-type zeolite as needed. Calcination removes impurities. A calcination method may be any method, includes treating at 100° C. or more and 600° C. or less in one or more atmospheres selected from the group consisting of an oxidizing atmosphere, an inert atmosphere, and a reduction atmosphere, and is preferably treating at 400° C. or more and 600° C. or less in the atmosphere.

EXAMPLES

The present embodiment is described below by examples. However, the present embodiment is not limited to these examples.

(Zeolite Structure)

A powder XRD measurement of a sample was implemented by using a powder X-ray diffractometer (apparatus name, UltimaIV, manufactured by Rigaku Corporation). Measurement conditions are as follows.

Acceleration voltage/current: 40 mA/40 kV
Radiation source: CuKα ray (λ=1.5405 Å)
Measurement mode: continuous scan
Scan condition: 40°/minute
Measurement range: $2\theta=3°$ to $43°$
Divergence longitudinal restriction slit: 10 mm
Divergence/entrance slit: 1°
Receiving slit: open
Receiving solar slit: 5°
Detector: semiconductor detector (D/teX Ultra)
Filter: Ni filter An obtained XRD pattern was analyzed under the following conditions, by using analysis software (software name, Smart Lab Studio II, manufactured by Rigaku Corporation) attached to the apparatus.

Fitting condition: automatic, make background finer, distributed pseudo voigt function (peak shape)
Background removal method: fitting process
Kα2 removal method: Kα1/Kα2 ratio=0.497
Smoothing method: B-Spline curve
Smoothing condition: second-derivative method, α-cut value=3, χ threshold=1.5

A zeolite structure was identified by comparing the analyzed XRD pattern with a reference pattern.

(Relative Crystallinity)

A relative crystallinity is the ratio [%] of the peak height of an XRD peak corresponding to the (20-1) face of a CHA structure of CHA-type zeolite that has been washed and dried after ion exchange, to a crystallized product (CHA-type zeolite) that has been collected from the crystallization step, washed, and dried.

An XRD peak corresponding to the (20-1) face was obtained by an XRD measurement similar to that in (Zeolite structure), and was considered a peak having a peak top at $2\theta=20.7\pm0.2°$.

(Composition Analysis)

A composition analysis of the sample was conducted by using a general inductively coupled plasma emission spectrometer (apparatus name, OPTIMA7300DV, manufactured by PERKIN ELMER Corporation). The sample was dissolved into a mixed solution of fluorine and nitrate, and a measurement solution was prepared. The composition of the sample was analyzed by using an obtained measurement solution.

(SiOH Amount)

The content of a silanol group of CHA-type zeolite was measured by $^1$H MAS NMR.

Before a measurement, the sample was held at 400° C. under vacuum atmosphere for 5 hours, and dehydrated, as a pretreatment. After the pretreatment, the sample cooled to the room temperature was picked and weighed under nitrogen atmosphere. A general NMR measurement apparatus (apparatus name, VNMRS-400, manufactured by Varian Corporation) was used as a measurement apparatus. Measurement conditions were as follows.

Resonant frequency: 399.8 MHz
Pulse width: $\pi/2$
Measurement wait time: 10 seconds
Accumulated number: 32 times
Rotational frequency: 15 kHz
Shift standard: TMS (tetramethylsilane)

A peak having a peak top at 2.0±0.4 ppm from an obtained $^1$H MAS NMR spectrum was considered a peak attributed to a silanol group. The peak was subjected to waveform separation by spectrum analysis software (GRAMS/AI Ver. 8.0, manufactured by Thermo Fisher Corporation), and then integrated intensity was derived. A calibration curve was generated by using result of NMR measurement of benzene as a standard substance. A proton amount originating from a silanol group in the sample was derived, by a calibration curve method, from the obtained integrated intensity of the NMR spectrum attributed to a silanol group, and an SiOH amount was derived from the proton amount, and the weighed mass of the sample.

Example 1

A 35 mass percent DMECHAOH aqueous solution, a 48 mass percent sodium hydroxide aqueous solution, water, and amorphous aluminosilicate ($SiO_2/Al_2O_3$=8.9) were mixed, and a raw material composition having the following molar compositions was obtained.

$SiO_2/Al_2O_3$=8.9
$DMECH^+/SiO_2$=0.08
$Na/SiO_2$=0.27
$H_2O/SiO_2$=18
$OH/SiO_2$=0.35

CHA-type zeolite was added to, as seed crystal, and mixed into the obtained raw material composition to reach 2.0 mass percent, and the resultant composition was put to fill an airtight container and hydrothermally treated at 160° C. for 48 hours, thereby obtaining a crystallized product constituted of a single phase of CHA-type zeolite. The obtained crystallized product was collected by solid-liquid separation, then washed with a sufficient amount of pure water, dried in the atmosphere, and then calcined at 600° C., thereby obtaining CHA-type zeolite.

CHA-type zeolite after calcined was constituted of a single phase of CHA-type zeolite, contained sodium as an alkaline metal, and had Na/Al of 0.87.

Ion exchange was conducted by mixing the CHA-type zeolite with an ammonium chloride aqueous solution having an ammonium ($NH_4^+$) concentration of 20 mass percent. The ammonium chloride aqueous solution used in the ion exchange was such that the amount of 20 mass percent ammonium chloride aqueous solution was 4.5 times by mass relative to CHA-type zeolite ($NH_4$/CHA=4.5). After the ion exchange, CHA-type zeolite according to the present embodiment was obtained by washing with pure water and drying. In the CHA-type zeolite according to the present example (CHA-type zeolite whose cation type was an ammonium type), $SiO_2/Al_2O_3$ was 8.7, and the sodium content was 400 ppm. Moreover, potassium was equal to less than a detection limit.

An SEM image of CHA-type zeolite according to the present example is illustrated in FIG. 1. CHA-type zeolite according to the present embodiment was composed of an agglomerated particle of crystal grains, and those crystal grains did not have some faces of a primary particle with at least one of rhombohedral and cubic shapes. The crystal grains had a crystal grain size of 0.5 μm or more and 1 μm or less, and the sizes of the main agglomerated particles were 50 μm or more and 70 μm or less.

Example 2

A 35 mass percent DMECHAOH aqueous solution, a 48 mass percent sodium hydroxide aqueous solution, water, and amorphous aluminosilicate ($SiO_2/Al_2O_3$=10.6) were mixed, and a raw material composition having the following molar compositions was used. Except for the above, crystallization, washing, drying, and calcination were conducted in a similar manner to Example 1.

$SiO_2/Al_2O_3$=10.6
$DMECH^+/SiO_2$=0.08
$Na/SiO_2$=0.29
$H_2O/SiO_2$=18
$OH/SiO_2$=0.37

The CHA-type zeolite after calcined was constituted of a single phase of CHA-type zeolite, contained sodium as an alkaline metal, and had Na/Al of 0.79.

The CHA-type zeolite was subjected to ion exchange, washing, and drying in a similar manner to Example 1, and CHA-type zeolite according to the present example was obtained. In CHA-type zeolite according to the present example, $SiO_2/Al_2O_3$ was 9.6, and the sodium content was 700 ppm, and an SiOH amount was $0.30 \times 10^{20}$/g.

Example 3

A 35 mass percent DMECHAOH aqueous solution, a 25 mass percent TMAdOH aqueous solution, a 48 mass percent sodium hydroxide aqueous solution, water, and amorphous aluminosilicate ($SiO_2/AL_2O_3$=10.6) were mixed, and a raw material composition having the following molar compositions was obtained. Except for the above, crystallization, washing, drying, and calcination were conducted in a similar manner to Example 1.

$SiO_2/Al_2O_3$=10.6
$DMECH^+/SiO_2$=0.06
$TMAd+/SiO_2$=0.02
$Na/SiO_2$=0.29
$H_2O/SiO_2$=18
$OH/SiO_2$=0.37

The CHA-type zeolite after calcined was constituted of a single phase of CHA-type zeolite, contained sodium as an alkaline metal, and had Na/Al of 0.82.

The CHA-type zeolite was subjected to ion exchange, washing, and drying in a similar manner to Example 1, and CHA-type zeolite according to the present example was obtained. In CHA-type zeolite according to the present example, $SiO_2/Al_2O_3$ was 9.9, and the sodium content was 140 ppm.

Figure 2:
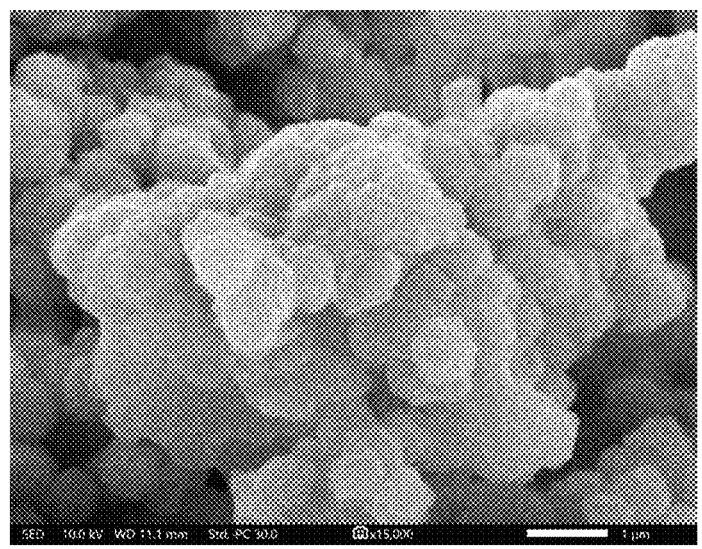
FIG. 2 is an SEM image of CHA-type zeolite according to Example 3 (the scale in the view is 1 μm).

An SEM image of CHA-type zeolite according to the present example is illustrated in FIG. 2. CHA-type zeolite according to the present embodiment was composed of an agglomerated particles of crystal grains, and those crystal grains did not have some faces of a primary particle with one of rhombohedral and cubic shapes. The crystal grains had a crystal grain size of 0.5 μm or more and 1 μm or less.

Example 4

A 35 mass percent DMECHAOH aqueous solution, a 48 mass percent sodium hydroxide aqueous solution, water, and amorphous aluminosilicate ($SiO_2/Al_2O_3$=12.8) were mixed, a raw material composition having the following molar compositions was used, and a crystallization time was 72 hours. Except for the above, crystallization, washing, drying, and calcination were conducted in a similar manner to Example 1.

$SiO_2/Al_2O_3$=12.8
$DMECH^+/SiO_2$=0.17
$Na/SiO_2$=0.35
$H_2O/SiO_2$=18
$OH/SiO_2$=0.52

The CHA-type zeolite after calcined was constituted of a single phase of CHA-type zeolite, contained sodium as an alkaline metal, and had Na/Al of 0.77.

The CHA-type zeolite was subjected to ion exchange, washing, and drying in a similar manner to Example 1, and CHA-type zeolite according to the present example was obtained. In CHA-type zeolite according to the present example, the sodium content was 300 ppm, $SiO_2/Al_2O_3$ was 9.7, and an SiOH amount was $0.27 \times 10^{20}$/g.

Figure 3:
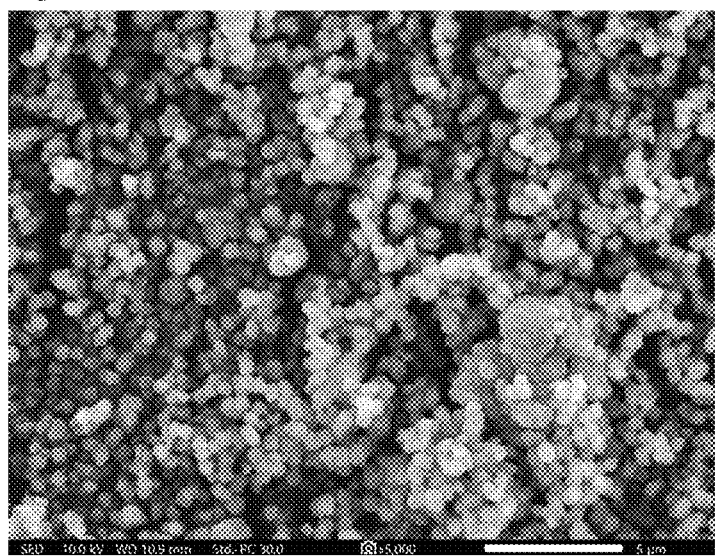
FIG. 3 is an SEM image of CHA-type zeolite according to Example 4 (the scale in the view is 5 μm).

An SEM image of CHA-type zeolite according to the present example is illustrated in FIG. 3. CHA-type zeolite according to the present embodiment was composed of crystal grains which did not have some faces of a primary particle mainly with at least one of rhombohedral and cubic shapes, and those crystal grains was in a state of dispersed. The crystal grain sizes of the crystal grains were 0.5 μm or more and 1 μm or less.

Example 5

CHA-type zeolite was obtained by conducting crystallization, washing, drying, and calcination in a similar manner to Example 2.

Ion exchange was conducted by mixing the CHA-type zeolite with an ammonium chloride aqueous solution having an ammonium ($NH_4^+$) concentration of 10 mass percent. The ammonium chloride aqueous solution used in the ion exchange was such that the amount of 10 mass percent ammonium chloride aqueous solution was 1.3 times by mass relative to CHA-type zeolite ($NH_4$/CHA=1.3). After the ion exchange, CHA-type zeolite according to the present example was obtained by washing with pure water and drying. In the CHA-type zeolite according to the present example, $SiO_2/Al_2O_3$ was 9.6, and the sodium content was 1270 ppm.

Comparative Example 1

CHA-type zeolite was obtained by conducting crystallization, washing, drying, and calcination in a similar manner to Example 2.

Ion exchange was conducted by mixing the CHA-type zeolite with an ammonium chloride aqueous solution having an ammonium concentration of 0.6 mass percent. The ammonium chloride aqueous solution used in the ion exchange was such that the amount of ammonium chloride aqueous solution was 6.6 times by mass relative to CHA-type zeolite ($NH_4$/CHA=6.6). After the ion exchange, CHA-type zeolite according to the present comparative example was obtained by washing with pure water and drying. In the CHA-type zeolite according to the present comparative example, an $SiO_2/Al_2O_3$ ratio was 9.8, and the Na content was 11,600 ppm.

Comparative Example 2

CHA-type zeolite was obtained by conducting crystallization, washing, drying, and calcination in a similar manner to Example 4.

Ion exchange was conducted by mixing the CHA-type zeolite with a 7.1% hydrochloric acid aqueous solution. The 7.1% hydrochloric acid aqueous solution used in the ion exchange was such that the amount of 7.1% hydrochloric acid aqueous solution was 2.5 times by mass relative to CHA-type zeolite ($NH_4$/CHA=0). After the ion exchange, CHA-type zeolite according to the present comparative example was obtained by washing with pure water and drying. In the CHA-type zeolite according to the present comparative example, the $SiO_2/Al_2O_3$ ratio was 9.9, and the Na content was 100 ppm.

Comparative Example 3

A 35 mass percent DMECHAOH aqueous solution, a 48 mass percent sodium hydroxide aqueous solution, a 48 mass percent potassium hydroxide aqueous solution, and amorphous aluminosilicate ($SiO_2/Al_2O_3$=10.6) were mixed, and a raw material composition having the following molar compositions was used.

$SiO_2/Al_2O_3$=10.6
$DMECH^+/SiO_2$=0.08
$Na/SiO_2$=0.275
$K/Na$=0.055
$H_2O/SiO_2$=18
$OH/SiO_2$=0.37

Except for the use of the obtained raw material composition, seed crystal was mixed and crystallized in a similar manner to Example 1. An obtained crystallized product was the mixture of CHA-type zeolite and ERI-type zeolite, and a single phase of CHA-type zeolite was not obtained.

Results of the examples and the comparative examples are shown in the following table.

TABLE 1

| | Relative crystallinity [%] | Na content(as $Na_2O$) [mass ppm] |
|---|---|---|
| Example 1 | 85.6 | 400 |
| Example 2 | 81.9 | 700 |
| Example 3 | 78.1 | 140 |
| Example 4 | 88.2 | 300 |
| Example 5 | 86.1 | 1,270 |
| Comparative Example 1 | 72.8 | 11,600 |
| Comparative Example 2 | 76.3 | 100 |

It can be confirmed that in the CHA-type zeolite according to each of the examples, Na/Al is 0.05 or less and 0.01 or less, and Na is reduced as compared with CHA-type zeolite after calcined. It can be confirmed from Comparative Example 1, CHA-type zeolite, which has been subjected to ion exchange by a low-concentration $NH_4Cl$ aqueous solution, is reduced in Na. In addition to this, such CHA-type zeolite is low in relative crystallinity, and has greatly deteriorated in crystallinity due to ion exchange. It is found out from Comparative Example 2, while crystallinity does not deteriorate in ion exchange by hydrochloric acid that is strong acid. On the other hand, it is also found out from Comparative Example, the reduction of Na is excessive, i.e., even Na capable of contributing to property improvement is removed out of remaining Na.

Measurement Example

CHA-type zeolite obtained by each of Examples 2, 3, and 5 and Comparative Examples 1 and 2 was subjected to dropping of a copper nitrate aqueous solution, and then mixed therewith in a mortar for 10 minutes. After mixed, the mixture was dried overnight at 110° C. in the atmosphere, and calcined at 550° C. for one hour in the atmosphere, resulting in each metal-containing CHA-type zeolite (copper-loaded CHA-type zeolite) loaded 4.6 mass percent copper.

(Hydrothermal Treatment)

The copper-loaded CHA-type zeolite was molded and crushed into agglomerated particles with a meshed agglomeration size of 12 to 20. After filling a normal-pressure fixed bed flow type reaction tube (hereinafter, also referred to as a "reaction tube") with 3 ml of agglomerated particles, a hydrothermal treatment was conducted under the following conditions.

Treatment atmosphere: air-flowing atmosphere with a water content of 10 volume percent volume percent
Flow speed of air: 300 mL/min
Treatment temperature: 800° C.
Treatment time: 16 hours (Nitrogen Oxide Reduction Rate)

A reaction tube was filled with 1.5 ml of agglomerated particles after the hydrothermal treatment, then, a nitrogen-oxide-containing gas was caused to flow while being held at the following measurement temperature, and nitrogen oxide concentrations at the inlet and outlet of the reaction tube were measured. The flow conditions of the nitrogen-oxide-containing gas are as follows.

Composition of nitrogen-oxide-containing gas:
NO 200 ppm
$NH_3$ 200 ppm
$O_2$ 10 volume percent
$H_2O$ 3 volume percent
$N_2$ balance
Flow volume of nitrogen-oxide-containing gas: 1.5 L/min
Space velocity: 60,000 $hr^{-1}$
Measurement temperature: 150° C. or 600° C.

A nitrogen oxide reduction rate ($NO_x$ reduction rate) was derived from the obtained nitrogen oxide concentration by the following equation.

Nitrogen oxide reduction rate (%)={([$NO_x$]in−[$NO_x$]out)/[$NO_x$]in}×100

[$NO_x$]in is the nitrogen oxide concentration of the nitrogen-oxide-containing gas at the inlet of the reaction tube, and [$NO_x$]out is the nitrogen oxide concentration of the nitrogen-oxide-containing gas at the outlet of the reaction tube.

TABLE 2

|  | Nitrogen oxide reduction rate [%] | |
| --- | --- | --- |
|  | 150° C. | 600° C. |
| Example 2 | 55.5 | 48.7 |
| Example 3 | 66.4 | 48.8 |
| Example 5 | 60.1 | 49.1 |
| Comparative Example 1 | 9.6 | 26.6 |
| Comparative Example 2 | 31.4 | 36.6 |

While Example 3 is copper-loaded CHA-type zeolite loading copper on CHA-type zeolite having a sodium content of 140 ppm, Comparative Example 2 is copper-loaded CHA-type zeolite loading copper on CHA-type zeolite having a sodium content of 100 ppm. It has been confirmed that even with only a 40-ppm difference of sodium content, copper-loaded CHA-type zeolite according to Comparative Example 2 has deteriorated in both low-temperature (150° C.) and high-temperature (600° C.) nitrogen oxide reduction rates, and has become about 0.5 times in low-temperature nitrogen oxide reduction rate, as compared with copper-loaded CHA-type zeolite according to Example 3.

CHA-type zeolite in which $SiO_2/Al_2O_3$ is 10 or less significantly deteriorates in nitrogen oxide reduction rate due to the decrease of $SiO_2/Al_2O_3$. However, it has been confirmed that copper-loaded CHA-type zeolite according to Example 2 ($SiO_2/Al_2O_3$=9.6) is high nitrogen oxide reduction rates in both low-temperature (150° C.) and high-temperature (600° C.), as compared with copper-loaded CHA-type zeolite according to Comparative Example 2 ($SiO_2/Al_2O_3$=9.9).

Furthermore, it can be confirmed that copper-loaded CHA-type zeolite loading copper on CHA-type zeolite having a sodium content of more than 1 mass present is high in $SiO_2/Al_2O_3$ as compared with copper-loaded CHA-type zeolite according to Example 2, but deteriorates in both low-temperature and high-temperature nitrogen oxide reduction rates.

The entire content of the specification, claims, and the abstract of Japanese patent application No. 2020-211757, filed on Dec. 21, 2020 is incorporated herein by reference as the disclosure of the specification of the present disclosure.

The invention claimed is:

1. A CHA zeolite, wherein a molar ratio of potassium to sodium is more than 0 and less than 0.05, a molar ratio of silica to alumina is less than 13, and a content of sodium is 100 ppm or more and 2000 ppm or less.

2. The CHA zeolite according to claim 1, wherein a content of a silanol group per mass of CHA zeolite is $0.50 \times 10^{20}$/g or less.

3. The CHA zeolite according to claim 1, wherein the CHA zeolite is CHA zeolite crystallized from a composition containing N,N,N-trialkylcyclohexylammonium cation.

4. The CHA zeolite according to claim 1, wherein a cation is one selected from the group consisting of an ammonium cation and a proton.

5. The CHA zeolite according to claim 1, containing one or more metallic elements selected from the group consisting of platinum, palladium, rhodium, iron, copper, cobalt, manganese, and indium.

6. The CHA zeolite according to claim 5, wherein the metallic element is contained in a state of being supported outside a zeolite framework.

7. A manufacturing method of CHA zeolite according to claim 1, wherein a molar ratio of potassium to sodium is more than 0 and less than 0.05, a molar ratio of silica to alumina is less than 13, and a content of sodium is 100 ppm or more and 2000 ppm or less comprising: obtaining a crystallized product by crystallizing a composition which includes a structure-directing agent source containing at least N,N,N-trialkylcyclohexylammonium cation, an alumina source, a silica source, a sodium source, and water; removing N,N,N-trialkylcyclohexylammonium cation from the crystallized product; and contacting the crystallized product with an ammonium-salt-containing solution having an ammonium concentration of 1 mass percent or more.

8. The manufacturing method according to claim 7, wherein the N,N,N-trialkyl cyclohexylammonium cation is at least one of N,N,N-dimethylethylcyclohexylammonium cation and N,N,N-methyldiethylcyclohexylammonium cation.

9. The manufacturing method according to claim 7, wherein the composition includes at least an amorphous compound including silicon and aluminum as a silica source and an alumina source, and includes at least one of a hydroxide or a halide of sodium as a sodium source.

10. The manufacturing method according to claim 7, wherein a crystallization temperature is more than 150° C.

11. The manufacturing method according to claim 7, wherein the composition includes at least amorphous aluminosilicate.

12. A nitrogen oxide reduction catalyst comprising CHA zeolite according to claim 1.

13. A nitrogen oxide reduction method using the nitrogen oxide reduction catalyst according to claim 12, wherein a molar ratio of potassium to sodium is more than 0 and less than 0.05, a molar ratio of silica to alumina is less than 13, and a content of sodium is 100 ppm or more and 2000 ppm or less.

* * * * *